United States Patent [19]

Randolph, Jr.

[11] 4,260,034

[45] Apr. 7, 1981

[54] CONVEYOR SCALE

[76] Inventor: George J. J. Randolph, Jr., 803 SE. Kane St., Roseburg, Oreg. 97470

[21] Appl. No.: 56,889

[22] Filed: Jul. 12, 1979

[51] Int. Cl.³ .................. G01G 3/14; G01G 11/14
[52] U.S. Cl. ........................................ 177/211; 177/16
[58] Field of Search ............ 177/16, 132, 145, 210 R, 177/211; 198/502, 504

[56] References Cited

U.S. PATENT DOCUMENTS

| 3,141,516 | 7/1964 | Moring, Jr. et al. | ......... 177/211 UX |
| 3,439,761 | 4/1969 | Laimins | .................. 177/211 |

*Primary Examiner*—George H. Miller, Jr.
*Attorney, Agent, or Firm*—Pitts and Kesterson

[57] ABSTRACT

Apparatus for detecting load weight on a conveyor belt. The belt is supported by an elongated roller which is carried on an elongated axle. Each axle end is received within a different one of two spaced axle supports. A deformation detector is connected to each support and generates an electrical signal directly related to force carried through the support. The detectors are connected in a circuit which produces a composite output signal directly related to vertical force only carried through both supports.

8 Claims, 4 Drawing Figures

CONVEYOR SCALE

BACKGROUND AND SUMMARY OF THE INVENTION

This invention pertains to an apparatus for detecting load weight on a conveyor belt, and more particularly, to such an apparatus which rejects all forces other than that created by the load weight on the conveyor belt.

A conventional conveyor belt system includes a plurality of rollers mounted on axles. An endless belt is looped around the rollers. One of the rollers is driven so that the belt is continuously moving over the rollers.

In the prior art, there are several devices and methods for detecting the weight of a load on a conveyor belt. Many of the prior art devices utilize a strain gauge attached to a portion of the roller support structure which deforms proportionately to the load on the belt. The gauge's resistance varies as it deforms, and by applying a voltage across the gauge, an electrical signal is generated which is proportionate to the weight of the load on the belt at a given instant in time.

Several problems exist with prior art devices which cause inaccurate measurements of a load on a belt. In some devices, it is necessary that the load be distributed evenly across the width of a belt in order for an accurate reading to be obtained. Also, in the prior art devices, it is possible for the shafts upon which the conveyor rolls are mounted to become heated (due to friction) and to expand, producing forces along the axles on which the conveyor rollers are mounted. These forces are ultimately detected by strain gauges, causing an inaccurate indication of load on the belt. At least one system carries the entire weight of a roller and axle on a gimbal which rests on a load cell. This system minimizes forces generated along the axles of the rollers. However, since the load cell always bears the entire weight of the roller and support structure for the roller, the output signal has a very poor signal-to-noise ratio, and it is therefore difficult to obtain an accurate load measurement. Another drawback is that such an arrangement is sensitive to torque, and thus can easily produce error indications.

A general object of the present invention is to provide a practical, easily installed, apparatus for detecting load weight on a conveyor belt, which apparatus eliminates the above-stated problems in the prior art.

According to a preferred embodiment of the invention, the proposed apparatus is for use with a conveyor belt supported by an elongated roller which is carried on an elongated axle having ends projecting from the roller. The apparatus includes a pair of axle supports which are substantially planar plates whose planes are oriented substantially normal to the rotational axis of the roller. Each plate has, for example, a displacement detector (deformation detector) connected thereto. The displacement detector deforms in proportion to the load on the plate to which it is attached. When the detector deforms, its electrical resistance varies proportionate to the amount of deformation. Each detector comprises two pairs of strain guages, or the like, each pair including one gauge which compresses while the other tenses, both in response to a vertical force on the support. Each support has such gauge pairs mounted on its opposing planar surfaces.

All of such strain gauges included in the apparatus are connected to form one-half of a bridge circuit, the other half being formed by a potentiometer. A meter is used across the bridge circuit. With this configuration, the only forces which generate signals through such a meter are vertical forces in the axles supports, representing only the load weight on the conveyor belt.

These and other objects and advantages attained by the invention will become more fully apparent as the description which follows is read in conjunction with the accompanying drawings.

DETAILED DESCRIPTION OF THE INVENTION

Figure 1:
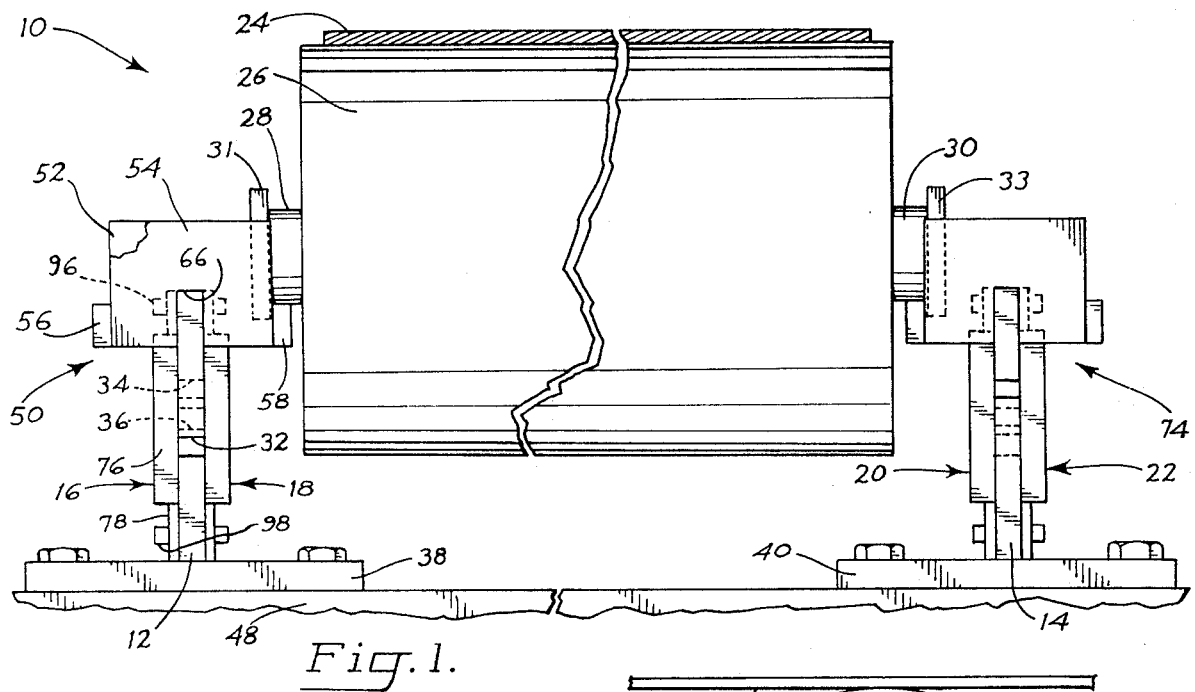
FIG. 1 is a partial, front view of part of a conveyor belt system including a portion of the apparatus of the instant invention.
Figure 2:
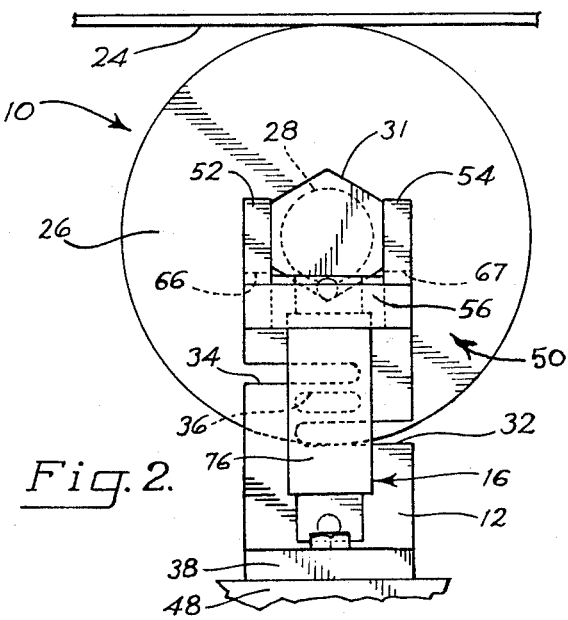
FIG. 2 is a left end view of the view of FIG. 1.

Turning now to the drawings, and referring first to FIGS. 1 and 2, indicated generally at 10 is a part of a conventional conveyor belt system, being supported by apparatus constructed in accordance with the present invention. Included within said apparatus are axle supports or plates 12, 14, and conventional strain-gauge pair carriers 16, 18, 20, 22. Strain-gauge pair carriers 16, 18, and carriers 20, 22 are each referred to herein as a deformation detector, and also as a displacement detector.

Included within conventional conveyor system 10, is a conveyor belt 24, an elongated roller 26, and an elongated axle having ends 28, 30. Fixedly attached to axle ends 28, 30 are hex nuts 31, 33, respectively.

Included within a complete conventional conveyor belt system are a plurality of rollers carried on axles like that which carries roller 26 in FIG. 1. The rollers are arranged so that a conveyor belt, like belt 24, can pass over each roller as shown in FIG. 1. The conveyor belt is typically an endless loop, with half of the loop going over the top of the rollers, as shown in FIG. 1, and the bottom half returning at some distance beneath the rollers (not shown in FIG. 1). With such a configuration, a drive system can be used to turn one of the rollers with the others acting as idlers. The belt moves along its endless path, and can be used to transport items over the tops of the rollers from one point to another.

When one of the rollers in such a system is supported in accordance with the apparatus of the instant invention, like roller 26 in FIG. 1, strain gauges therein can be connected to form a portion of a bridge circuit, with the other portion comprising a potentiometer and meter. Forces created by the weight of items riding on belt 24 transmitted into plates 12, 14, thereby deforming the gauge pairs attached thereto. When a gauge is deformed, its resistance changes. When a voltage is impressed across the gauges, a varying current is produced, which current is proportionate to the load on belt 24. Current is passed through a meter, and a reading on the meter is generated which indicates the load supported by roller 26 at that particular instant in time. When belt 24 travels at a known speed, the indication on the meter is proportionate to the weight per unit of time which passes across roller 26.

Directing attention now to FIG. 2, and examining more particularly the structure of plate 12, notches 32, 34 (partially obscured by carrier 16) extend inwardly from opposing edges of the plate. Slot 36 (shown in dashed lines behind carrier 16), is centrally located in plate 12 and extends completely therethrough. Considering the point of view illustrated in FIG. 1, plate 12 is disposed with notch 32 facing toward the viewer, and with notch 34 facing away from the viewer. Plate 14 is similar in construction to plate 12, but as viewed in FIG. 1 is reversely oriented respecting its notches which correspond to notches 32, 34.

Looking now to both FIGS. 1 and 2, beneath plates 12, 14 are bases 38, 40, respectively. Base 38 is substantially planar and is rectangularly shaped. This base is jointed as by welding to plate 12 at a substantially normal angle. Base 40 is of similar construction and is similarly joined to plate 14. Bases 38, 40 are anchored as by bolting on a frame member 48 in system 10.

Located above plate 12 and fitted thereover is a support yoke indicated generally at 50. Included within yoke 50 are opposing sides 52, 54. Also included are connecting bars 56, 58, the ends of which are visible in FIG. 1. Sides 52, 54, are substantially parallel, and are maintained in that configuration by bars 56, 58. Bars 56, 58 are joined at the locations shown to sides 52, 54. Each opposing side 52, 54 has a rectangular notch therein like notch 66 in side 54. As can be seen, notch 66 receives a top portion of plate 12. A rectangular notch 67 in side 52 (see FIG. 2) likewise receives a top portion of plate 12 opposite notch 66. Yoke 50 is attached as by welding to plate 12. (The support yokes provide end play for, and anti-rotation of, roller 26.)

Similarly fitted with plate 14 is a yoke 74 similar in construction to yoke 50.

Roller 26, its associated axle, the ends 28, 30 of which are visible in FIG. 1, and hex nuts 31 and 33 are all of conventional construction. Roller 26 rotates about the axle on internal bearings. As can be seen in FIG. 1, hex nuts 31, 33 are received by yokes 50, 74, respectively, with axle end 28 resting on bar 58 in yoke 50, and with axle end 30 resting on the corresponding bar in yoke 74. Further, and as can be seen in FIG. 2, hex nut 31 is constrained between sides 52, 54 in yoke 50. Likewise, hex nut 33 is constrained between the opposing sides in yoke 74. Thus, in this configuration, the axle is fixedly held and roller 26 is free to rotate.

Figure 3:
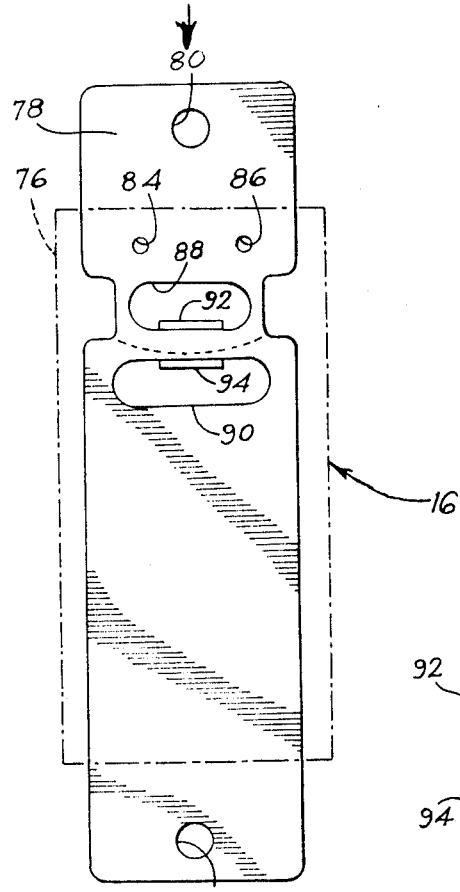
FIG. 3 is an exposed view of a gauge pair as used on the supports shown in FIGS. 1 and 2.

Directing attention now to FIGS. 1 and 3, included within conventional strain-gauge pair carrier 16, is a cover 76 (shown as dot-dash lines in FIG. 3). Also included is a substantially planar flex bar 78. Included in bar 78 are plate-mounting holes 80, 82, and cover-mounting holes 84, 86. Upper slot 88 and lower slot 90 are located on bar 78 as shown and extend therethrough. Fixedly attached to the adjacent-margin edges in slot 88, 90, and positioned as shown, are strain gauges, or strain-sensitive devices, 92, 94, respectively. Cover 76 is mounted on bar 78 by screws (not shown) extending through the cover at the locations of holes 84, 86. Bar 78 is fixedly mounted on plate 12 by nut and bolt assemblies 96, 98 (see FIG. 1). Each other carrier 18, 20, 22, is constructed like carrier 16, and is likewise mounted on its associated plate. In FIG. 2, carrier 18 is located directly behind carrier 16 on the opposite side of plate 12. Carriers 20, 22 are likewise mounted on plate 14.

Figure 4:
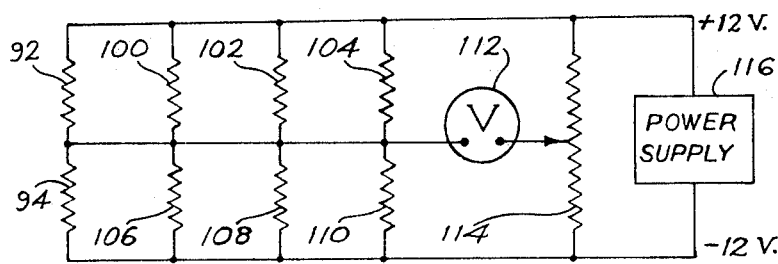
FIG. 4 is a schematic diagram of the interconnection of the strain gauges of the apparatus with their associated circuitry.

Looking now to FIG. 4, indicated generally at 99 is a circuit which interconnects the strain gauges in the apparatus. Gauge 92 is connected in parallel with three other gauges 100, 102, 104, which are located in carriers 18, 20, 22, respectively, at positions like that shown in FIG. 3 for gauge 92. Similarly, gauge 94 is connected in parallel with three other gauges 106, 108, 110 which are located in carriers 18, 20, 22, respectively, at positions like that shown in FIG. 3 for gauge 94. Also included within circuit 99 is a voltage meter 112, a potentiometer 114, and a direct current power supply 116.

As will be recalled, the illustration of FIG. 1 includes only a portion of system 10. The system in its entirety is used to transport material of one sort or another from one place to another by placing it on belt 24. There are many instances in which it is desirable to know the mass flow rate of material on belt 24. Such rate is the weight per unit of time which passes over any given point on belt 24.

When the system is in normal operation, forces created by the downward weight of material on belt 24 are transmitted ultimately to plates 12, 14. The configuration of these plates as viewed in FIG. 2 is such that a downward force in the plates tends to compress them somewhat due to the presence of notches 32, 34, and slot 36.

Looking now to FIG. 3, when plate 12 compresses as a result of a vertical force therein, flex bar 78 has a force transmitted to it along its axis as shown by the arrows in FIG. 3. When such a force is present along the vertical axis of the bar, the portion thereof which separates upper slot 88 and lower slot 90 tends to flex into a position with its long axis following the dashed line shown (with an expanded vertical dimension) between the slots. As a result of deformation of bar 78 between the two slots therein, gauge 92 is compressed, and gauge 94 is tensed. When carrier 16 is mounted on plate 12 as in FIG. 1, it is possible for the carrier to be subject to forces generated other than by vertical loading of plate 12 as described above. If, for example, for one reason or another, there is a force which is directed along the longitudinal axis of roller 26 which tends to pull plate 12 in toward the roller, bar 78 is placed in tension as plate 12 bends toward the end of the roller. When the bar is in tension, the portion of the bar which separates the slots tends to flex upwardly. Thus, gauge 92 is placed in tension while gauge 94 compresses. When plate 12 bends as a result of such force, the bar in carrier 18 which corresponds to bar 78 is compressed, and its associated strain gauges react in the same manner as when bar compression is a result of vertical loading.

Directing attention to FIG. 4, as will be recalled, all strain gauges 92, 100, 102, 104 in the upper slot of each flex bar within the strain-gauge pair of carriers are connected in parallel. Also, strain gauges 94, 106, 108, 110 which are associated with the lower slot of each flex bar are connected in parallel. Thus, when each plate 12, 14 is subject only to vertical loading, the total parallel resistance of gauges 92, 100, 102, 104 decreases while the total parallel resistance of gauges 94, 106, 108, 110 increases in response to such loading. As can be seen, this increases the voltage which is applied to meter 112, thus indicating the presence of a load over roller 26. Assuming that the belt moves at a constant rate, the indication on meter 112 represents a mass flow rate on belt 24. Potentiometer 114 is adjusted prior to any loading on belt 24 in order to zero meter 112.

Let us assume, for example, that the top of plate 12 is being subjected to a wholly horizontal force which tends to pull plate 12 toward roller 26. As will be recalled, this type of force tenses bar 78, thus tensing gauge 92 and compressing gauge 94. Also, in carrier 18, gauge 106 (in FIG. 4) is tensed while gauge 100 compresses. Since both bar 78 and the bar associated with carrier 18 are firmly attached to opposing sides of plate 12, a given amount of bending of plate 12 produces equal forces of tension and compression in bar 78 and in the bar associated with carrier 18, respectively. As a consequence, the resistance changes which occur in the gauges arranged on opposite sides of the bridge circuit shown in FIG. 4 result in the circuit remaining balanced. Hence, the circuit "rejects" plate loading of this type.

What has just been described for single-direction bending in plate 12, vis-a-vis bending-load rejection, is true for all conditions of such bending in either or both of the plates.

Another kind of force which can be generated in plates 12, 14 is caused by a change in the torque required to turn roller 26. This can come about as a result of bearing wear in the roller, even to the point where the roller "locks up". As the wear increases and the torque required to turn the roller increases, belt 24 tends to pull each plate with its associated yoke in the direction of belt travel, more so than if the torque required to turn roller 26 had not increased. Looking at FIG. 2 and assuming that belt 24 is moving to the right, this excess roller torque generates a force in supports 12, 14 which tends to pull and bend them slightly to the right. Due to the reversed orientations mentioned earlier for plates 12, 14 deformations therein resulting from this action are ignored, and produce no error readings.

Thus, a reliable and accurate apparatus for detecting load weight on a conveyor belt has been shown. The only forces generated in the roller support structures of such apparatus are those generated solely by load weight on the belt.

While a specific form of axle support has been shown herein which is "sensitized" to report vertical loads only, it is understood that various other support configurations are possible.

Accordingly, while a preferred embodiment of the invention has been described herein, it is appreciated that other variations and modifications may be made without departing from the spirit of the invention.

It is claimed and desired to secure by Letter Patent:

1. Apparatus for detecting load weight on a conveyor belt comprising:
    a support frame;
    a roller suitable for rotation about its longitudinal axis, having first and second ends, and a surface for supporting said conveyor belt;
    first and second support members located between said support frame and said roller for rotatably supporting said roller along said longitudinal axis at said first and second ends respectively and at first and second selected locations respectively with respect to said support frame when said conveyor belt is in an unloaded condition; and
    first and second measuring means operating cooperatively with said first and second support means respectively for determining deviations from said first and second selected locations, and for providing an output indicative of said deviations.

2. The apparatus of claim 1 wherein each of said first and second support members comprises a support plate having first and further coplanar faces and first and further vertical edges, said plate occupying a plane oriented substantially normal to said longitudinal axis of said roller and extending from said ends of said roller to said support frame, each of said support plates including notches such that loading of said conveyor belt deforms said plate thereby resulting in vertical displacement of said roller with respect to said support frame.

3. The apparatus of claims 1 or 2 wherein said measured deviation includes measurement of the vertical displacement of said roller with respect to said support frame and wherein said measuring means generates a composite output electrical signal directly related only to said vertical displacement.

4. The apparatus of claim 3 wherein said measuring means are strain detectors suitable for generating an electrical signal indicative of said vertical displacement of said roller from said support frame resulting from loading said conveyor belt.

5. The apparatus of claim 2 wherein each of said support plates includes first and second notches, said first notch extending from said first vertical edge toward said further vertical edge, and said second notch being vertically displaced from said first notch and extending from said further vertical edge toward said first vertical edge.

6. The apparatus of claim 5 wherein said support first and second plates are reversed with respect to said notches.

7. The apparatus of claims 2, 5 or 6 wherein said measuring means are strain detectors connected to produce a composite electrical output indicative only of said vertical displacement, each of said strain detectors comprising two pairs of strain gauges, each pair including one gauge which compresses while the other tenses, both in response to vertical displacement of said roller with respect to said support frame and resulting from loading said conveyor belt.

8. The apparatus of claim 7 wherein one each of said pair is mounted on said first and further faces respectively and said strain guages being connected such that outputs from said gauges, indicative of deformation of said support, are self cancelling for all forces applied to said roller which do not result from loading of said conveyor belt such that an electrical output, only indicative of the loading on said conveyor belt is provided.

* * * * *